A. B. LANDIS.
CHANGE SPEED GEARING.
APPLICATION FILED JULY 27, 1915. RENEWED MAY 14, 1918.
1,289,201.
Patented Dec. 31, 1918.
8 SHEETS—SHEET 6.
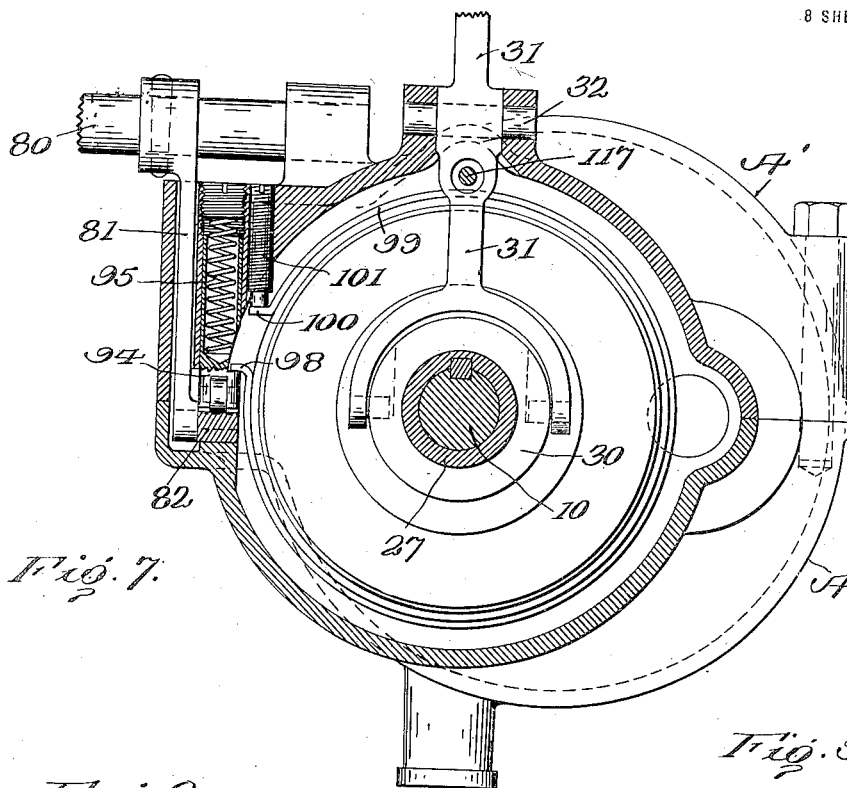
Fig. 7.
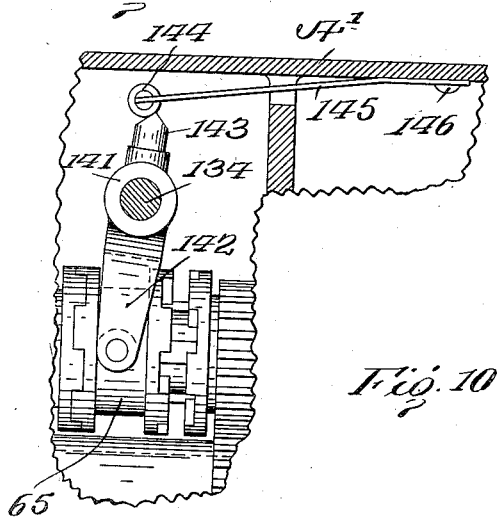
Fig. 8.
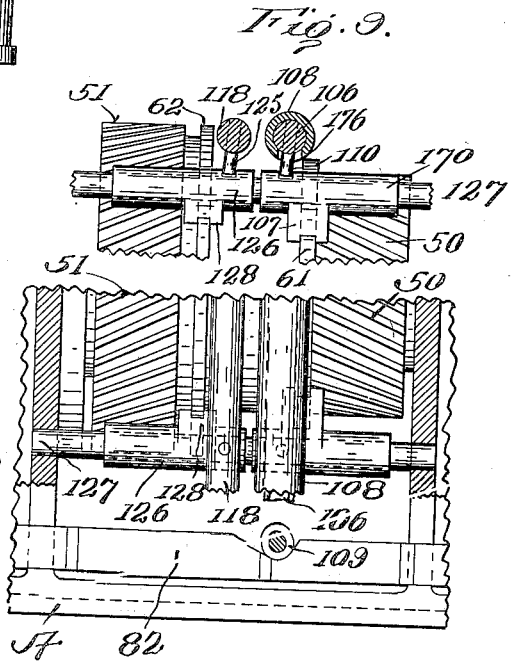
Fig. 9.
Fig. 10.
WITNESSES:
INVENTOR
Abraham B. Landis,
BY
Bedford & Doolittle,
ATTORNEYS.

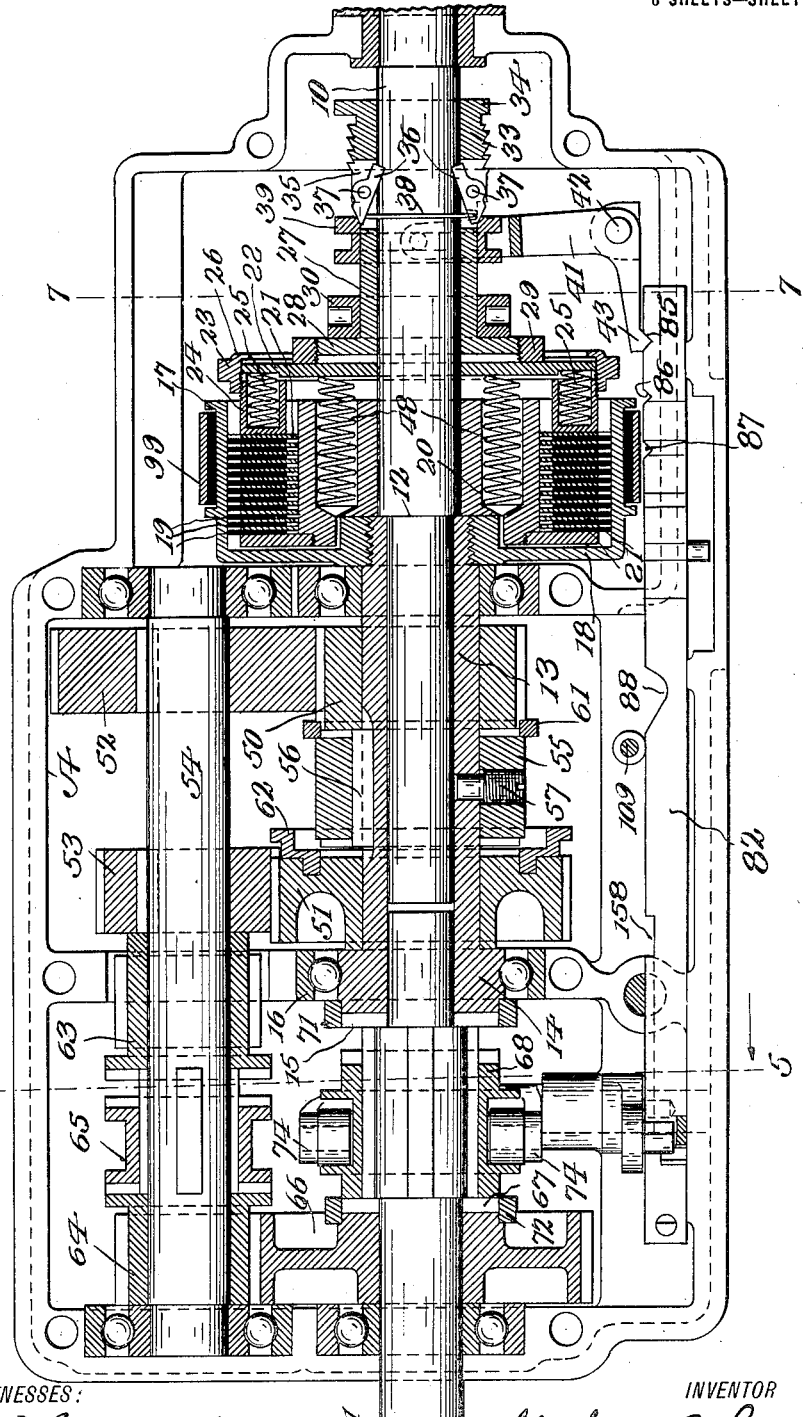
A. B. LANDIS.
CHANGE SPEED GEARING.
APPLICATION FILED JULY 27, 1915. RENEWED MAY 14, 1918.
1,289,201.
Patented Dec. 31, 1918.
8 SHEETS—SHEET 1.

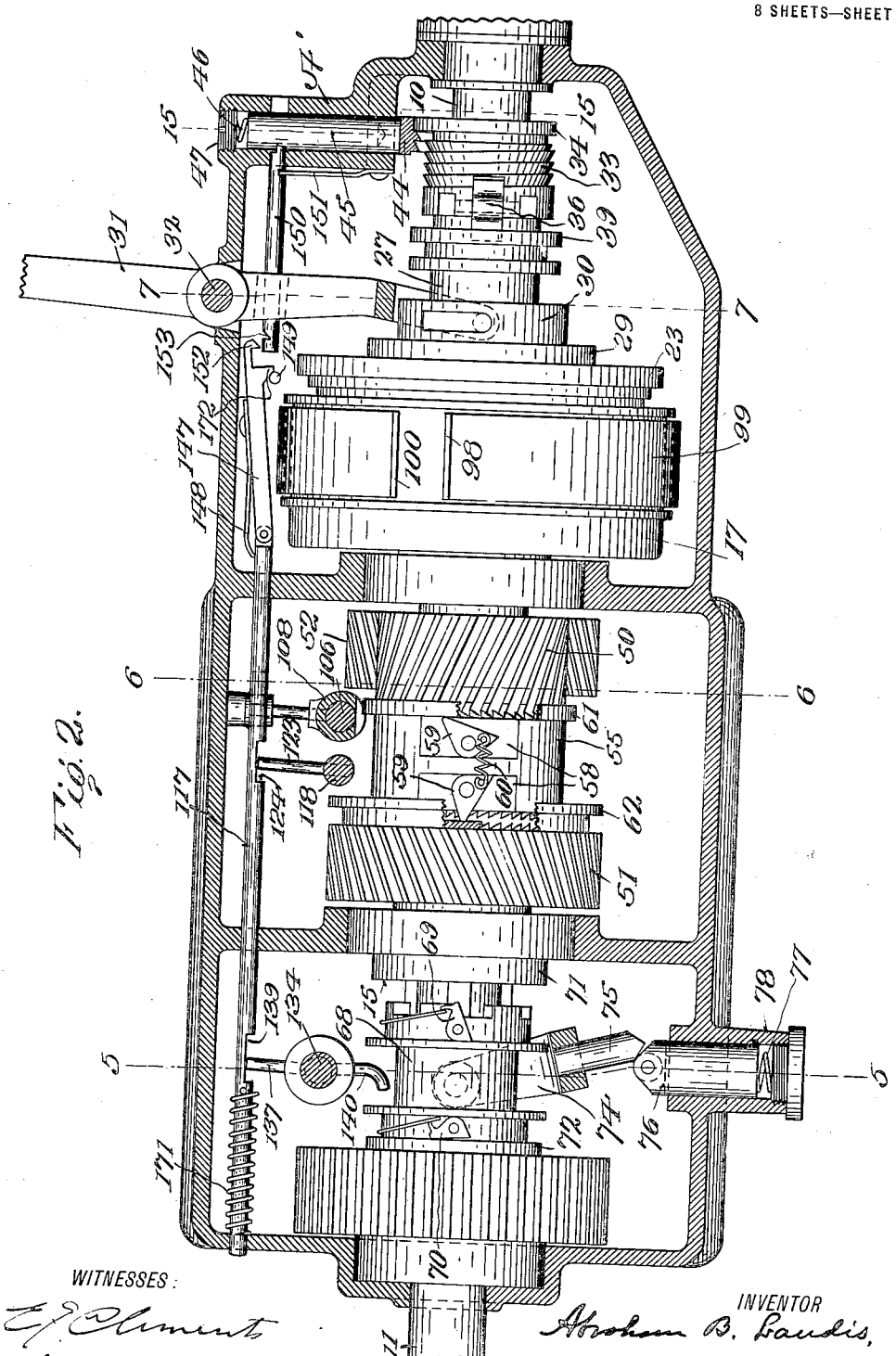

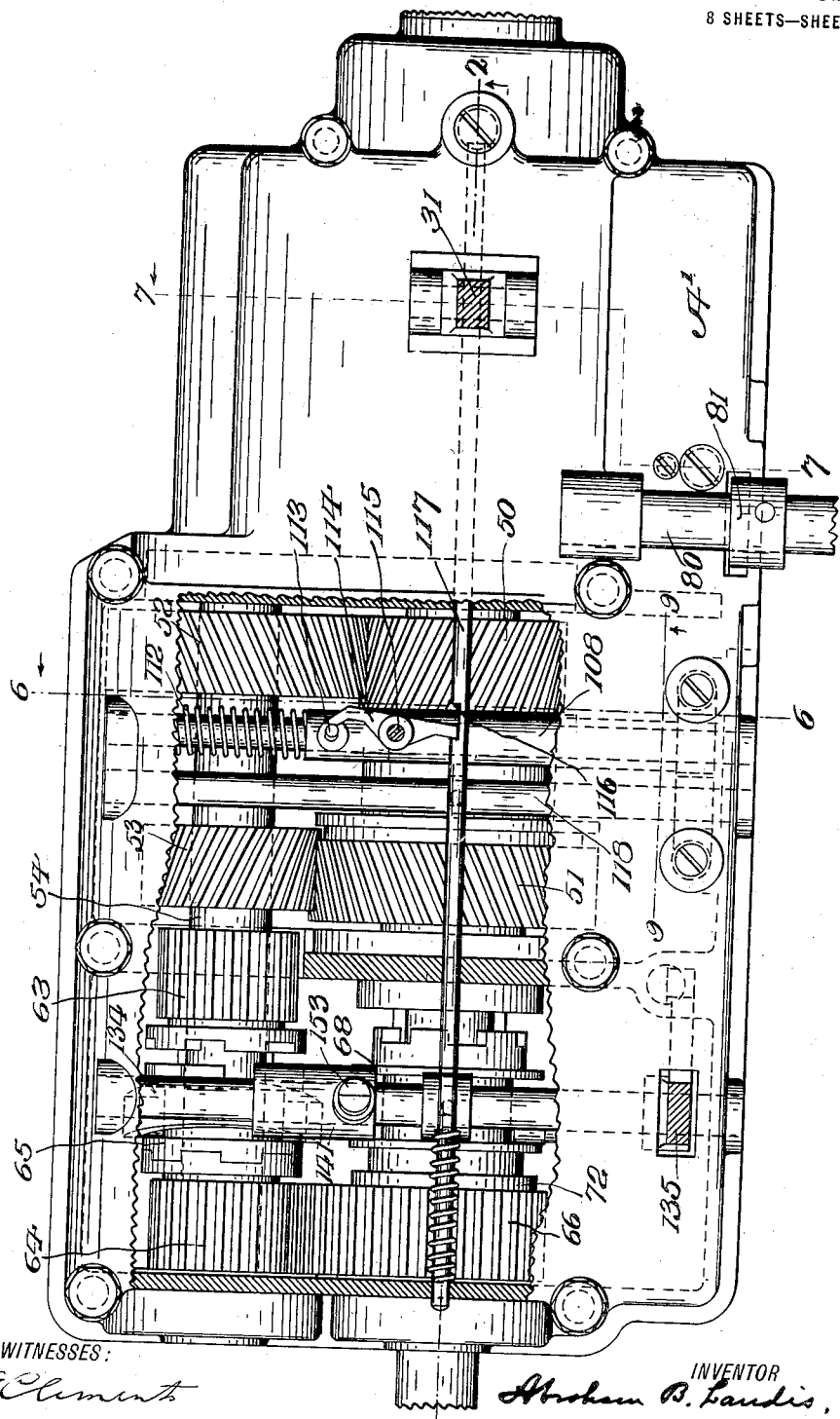

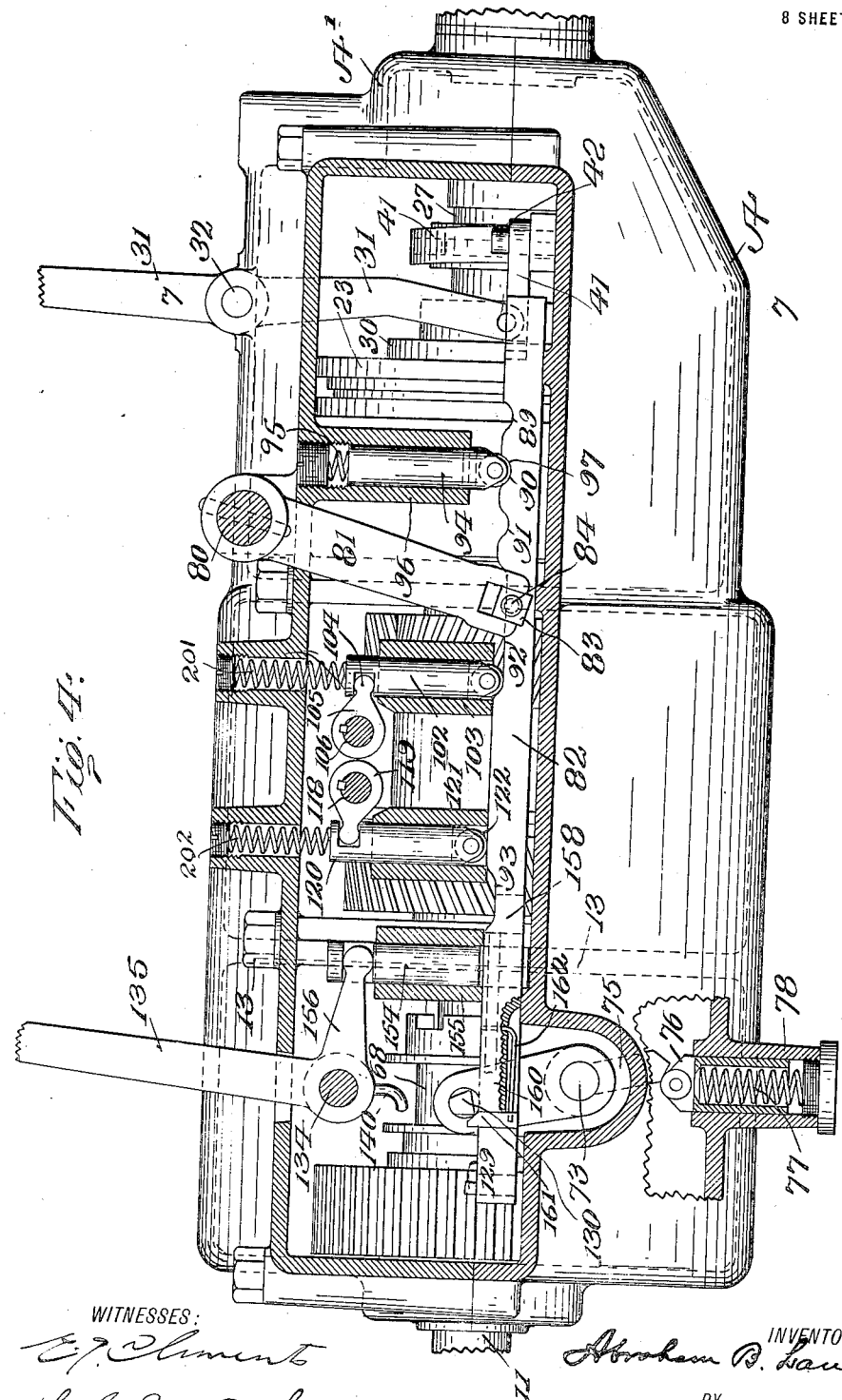

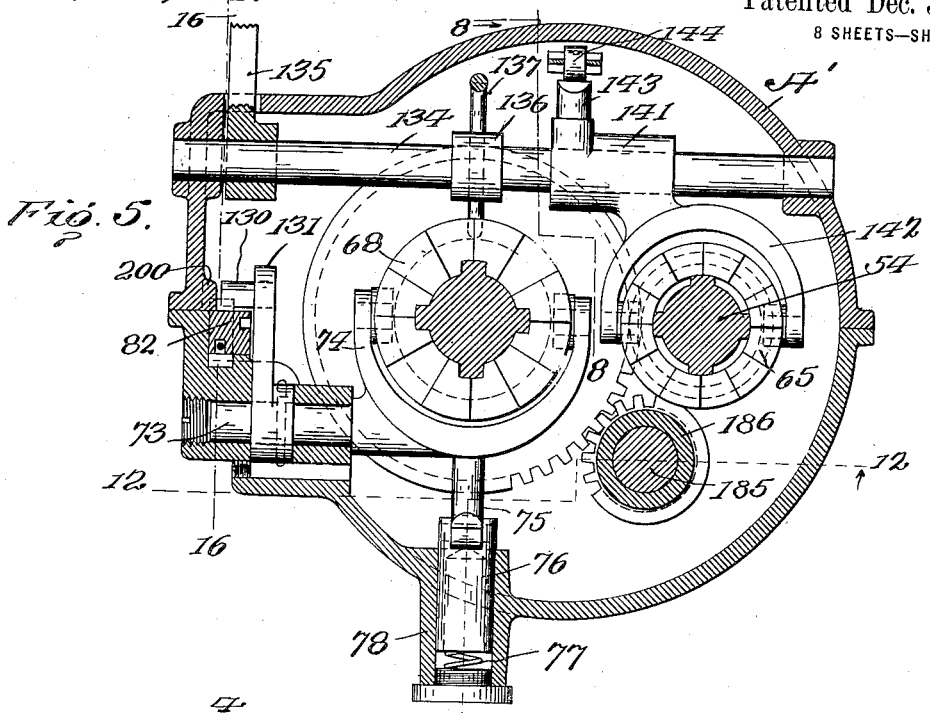
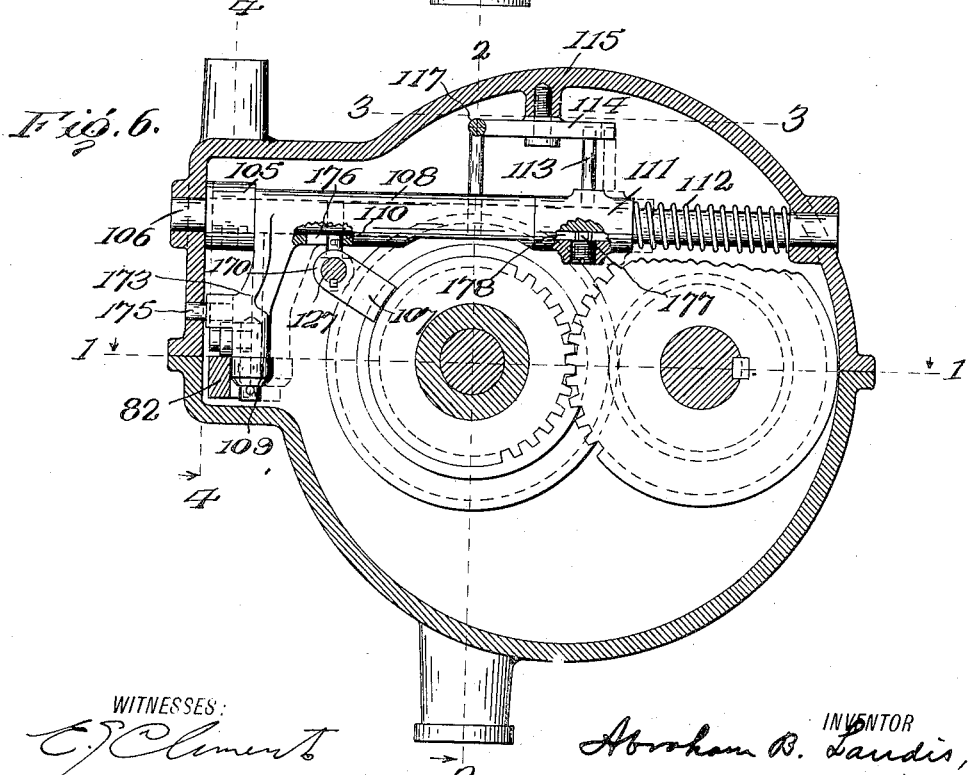

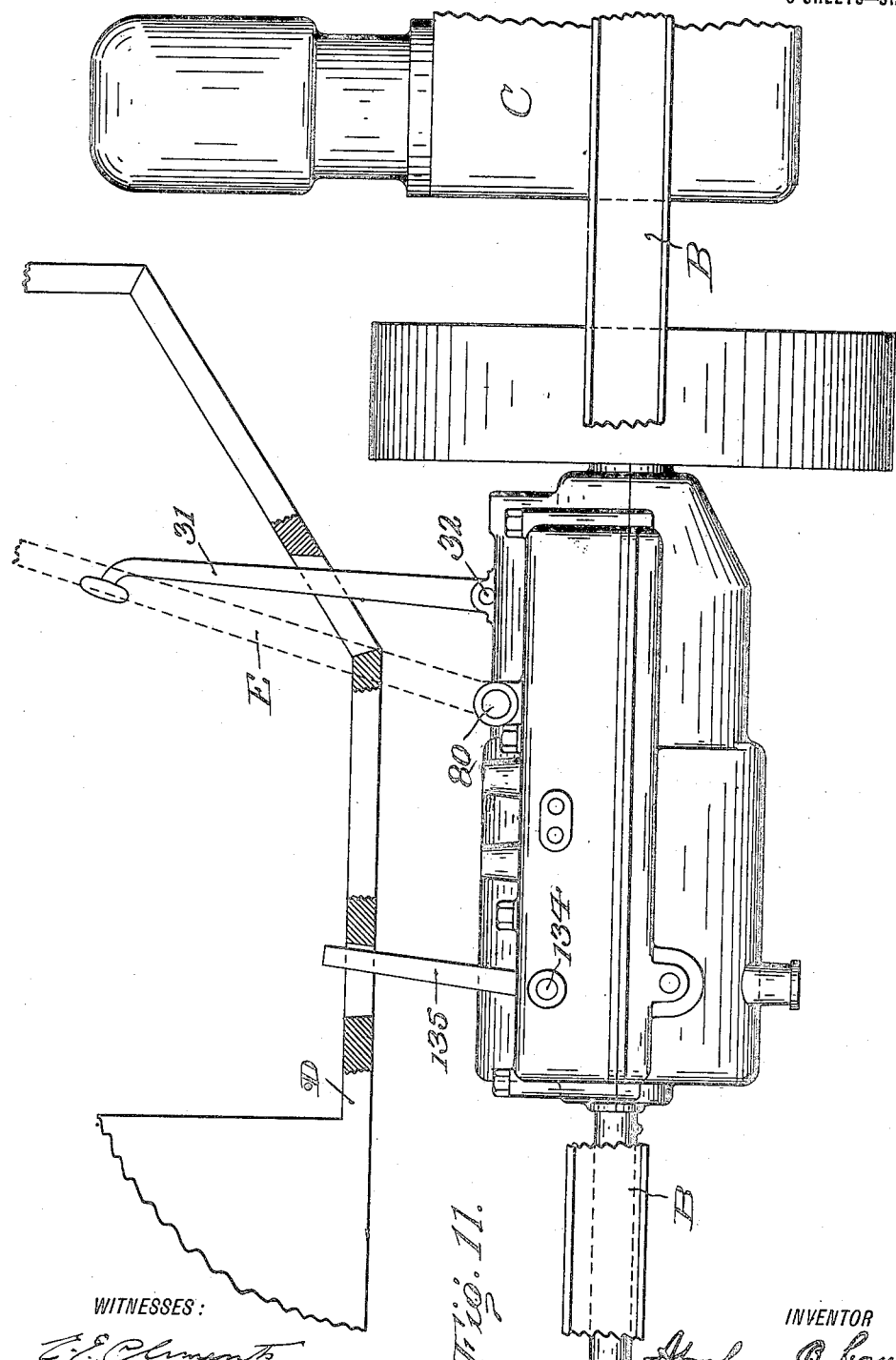

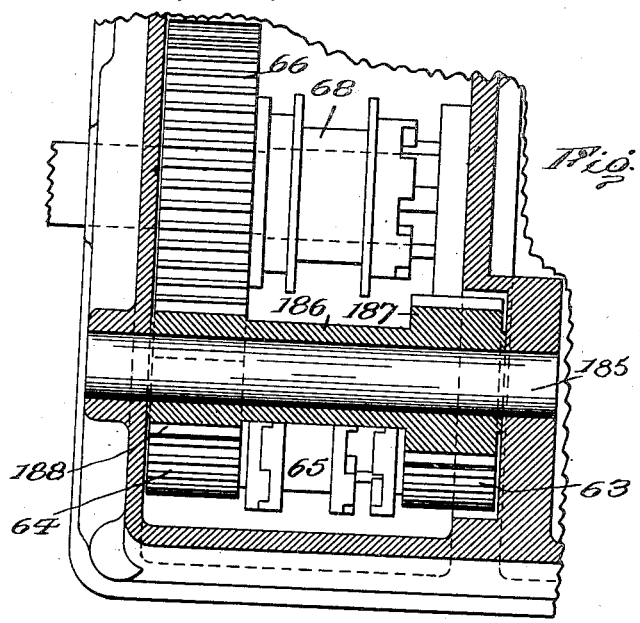
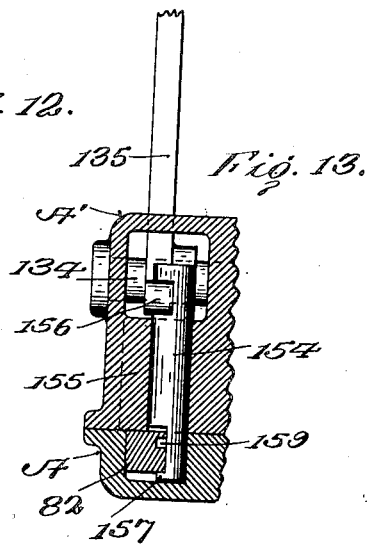
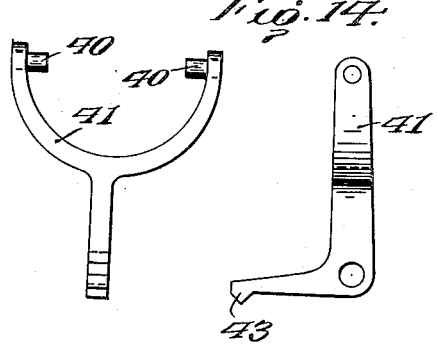
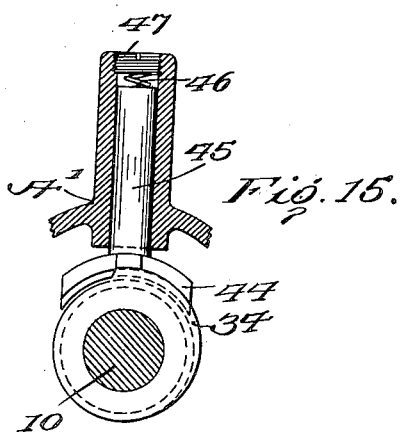
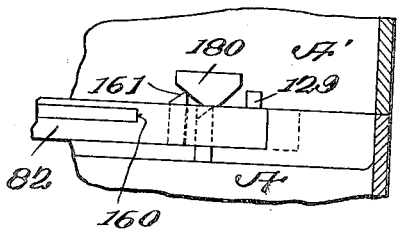

UNITED STATES PATENT OFFICE.

ABRAHAM B. LANDIS, OF ENFIELD, PENNSYLVANIA.

CHANGE-SPEED GEARING.

1,289,201.      Specification of Letters Patent.      Patented Dec. 31, 1918.

Application filed July 27, 1915, Serial No. 42,188. Renewed May 14, 1918. Serial No. 234,532.

*To all whom it may concern:*

Be it known that I, ABRAHAM B. LANDIS, a citizen of the United States, residing at Enfield, Montgomery county, and State of Pennsylvania, have invented and discovered certain new and useful Improvements in Change-Speed Gearing, of which the following is a specification.

My said invention relates to change speed transmission gearing, designed especially for use in motor cars, but also adapted for other service wherein a change speed gearing is required. Said invention consists in an improved construction and arrangement of parts of the gearing, whereby the change of speed can be effected by the motion of a single lever from point to point to change the speed without operating any other part, the movement of the lever operating, through mechanism controlled thereby, to effect the change of speed without clash or shock, all as will be hereinafter more fully described and claimed.

Referring to the accompanying drawings on which like reference characters indicate similar parts, Figure 1 is a horizontal sectional view through the gear casing and gear contained therein, the section being taken on the line of union between the two parts of the casing and the upper part of the casing being removed, said view being in effect a sectional view looking downwardly from the dotted line 1—1 in Fig. 6, Fig. 2 a vertical section through one side of the casing, showing the gear in elevation, as on the dotted line 2—2 in Figs. 3 and 6, Fig. 3 a top view showing a portion of the casing broken away and the gearing within in top plan, Fig. 4 a side view showing a portion of the casing broken away with the mechanism within in side elevation, as seen from dotted line 4—4 in Fig. 6, Fig. 5 a cross-section on the dotted line 5—5 in Figs. 1 and 2, Fig. 6 a cross-section on the dotted line 6—6 in Figs. 2 and 3, Fig. 7 a cross-section on the dotted line 7—7 in Figs. 2 and 3, Fig. 8 a detail view of a clutch shifting device, as seen when looking in the direction of the arrows from the dotted line 8—8 in Fig. 5, Fig. 9 a detail view seen when looking in the direction of the arrows from the dotted line 9—9 in Fig. 3, Fig. 10 a top or plan view of the parts shown in Fig. 9, Fig. 11 a diagrammatic view showing the application of the gear casing to an automobile structure, Fig. 12 a detail view showing the arrangement of the reversing gear, as seen when looking upwardly from the dotted line 12—12 in Fig. 5, Fig. 13 a detail sectional view on the dotted line 13—13 in Fig. 4, Fig. 14 detail views illustrating in front and edge elevation the form of one of the parts, Fig. 15 a detail section on the dotted line 15—15 in Fig. 2, and Fig. 16 a detail view on the dotted line 16—16 in Fig. 5.

In said drawings the portions marked A and $A^1$ represent the two parts of the gear casing, A representing the lower or main part of said casing and $A^1$ the upper part; B the automobile chassis; C the engine; D the automobile body; and E the main operating lever.

All of these parts require no special description except such as may be incidental in describing the other parts of the apparatus.

The gear comprises a driving shaft 10 coupled to the engine in any approved manner, and a driven shaft 11 from which power is transmitted to the driving mechanism of the vehicle, as is usual.

Said driving shaft 10 and driven shaft 11 are mounted and extend through suitable ball-bearings appropriately arranged in the gear casing, substantially as shown. They are mounted in line with each other and with their inner ends adjacent and nearly meeting at a point midway of said casing. Shaft 10 is formed with an offset at point 12, and an elongated sleeve 13 extends from this point to beyond the end of said shaft, the inner end 14 of said sleeve being formed enlarged and with a clutch face 15 on its outer end. Said end of said sleeve is supported by means of ball-bearings in a central partition 16 in the casing, its other end being similarly supported, as shown.

Said sleeve 13 and driving shaft 10 are adapted to be coupled together by a multiple-disk clutch which consists of an outer clutch part 17 in the form of a cylindrical rim on a base plate 18 formed with a central hub and secured to the outer end of sleeve 13 by means of a screw-threaded connection. Said clutch part carries a series of inwardly projecting annular disks 19, as best shown in Fig. 1. The other clutch part, or center 20 is keyed to the shaft 10 and carries a series of outwardly projecting disks 21. Said disks 19 and 21, on the respective clutch parts, interengage with each other and are adapted to slide in grooves in their respective supports in a manner well understood in this type of clutch. A disk 22 is mounted to slide on the shaft 10 and within a ring 23, which ring carries a hollow annulus 24 connected thereto by a screw-threaded connection, and which is adapted to serve as a pressure member for engaging the clutch disks. A series of coiled springs 25 are mounted in said annulus and bear against the face of disk 22 which is adapted to slide for a distance between an overhanging flange 26 on the outer face of ring 23 and the end of said annulus 24. By means of this structure, the turning of ring 23 serves to adjust the length of the pressure member to secure the best results in the operation of the clutch or to take care of wear on the parts from time to time.

A sliding sleeve 27 is mounted on shaft 10 outside disk 22, having a disk 28 on its inner end on which another ring 29 is mounted by screw-threads, enabling further adjustment to be secured. Said ring 29 bears against the outer face of disk 22. A collar 30 is mounted on said sleeve 27 and is connected to a foot-lever 31 mounted on a pivot 32 on the top casing, by means of which said lever may be operated and the clutch set by foot power when desired. Near its outer end, said sleeve is formed with an exteriorly screw-threaded part 33, its extreme outer end being formed with a cam 34 best shown in Fig. 15. On diametrically opposite sides, said sleeve 27 is formed with recesses 35, in which latches 36 are mounted on pivots 37. The outer end of said latches are adapted to engage with notches in shaft 10 to lock the clutch in engaged position. A spring 38 is interposed between said latches and tends to normally hold them in engagement with said notches. Another collar 39 is mounted to slide on sleeve 27, being formed with a circumferential groove which engages the inwardly extending pins 40 of an angle-shifting fork 41, which is mounted on a pivot 42 near the lower end of the casing and has a forwardly extending arm with a double-faced cam 43 on the outer end for a purpose to be presently described.

A segmental nut-part 44, with screw-threads adapted to engage with the screw-threaded part 33 of sleeve 27, is mounted on the lower end of a reciprocating plunger 45, which is mounted in a suitable socket in the casing A¹. A spring 46, interposed between the upper end of said plunger and a screw plug 47 which closes said socket, tends to normally hold said nut-part toward the shaft. Said nut-part is formed with a plane face outside the threaded portion adapted to engage the cam 34, as best shown in Fig. 2. Coiled springs 48 are mounted in suitable sockets in the clutch center 20 and bear outwardly against disk 22, normally tending to force said disk and the sleeve 27 outwardly and to release the disks constituting the clutch from operative engagement as soon as latches 36 are unlatched.

It will be understood, of course, that the details of this clutch mechanism are not regarded as essential to the operation of the change speed gear mechanism forming the chief subject matter of my present invention, but it has been thus fully described in order that its operation and the operation of the complete apparatus may be better understood.

Gears 50 and 51, respectively, are mounted to revolve loosely on sleeve 13 and mesh with complementary gears 52 and 53 which are keyed to a counter-shaft 54 supported by appropriate ball-bearings in the gear casing. Interposed between gears 50 and 51, is a double-faced clutch member 55 secured to sleeve 13 by means of a key 56 to prevent circumferential movement and a radial pin, or screw, 57 to prevent longitudinal movement. The adjacent faces of gears 50 and 51 are each formed as clutch faces adapted to coöperate with the adjacent clutch faces of said clutch part 55. The teeth of said clutch parts are formed as most clearly shown n Fig. 2, being tapered on one side and formed with a square face on the other so that they are adapted to drive only in one direction. Clutch member 55 is formed with a pair of recesses 58 in its periphery on one side, in each of which a dog 59 is pivoted, which dogs are connected at their inner ends by a coiled spring 60 which normally holds them with their points bearing outwardly against the faces of rims 61 and 62 on said gears 50 and 51, respectively, for a purpose to be presently described. Counter-shaft 54 has gears 63 and 64 mounted thereon with clutch teeth on their adjacent faces and a sliding clutch part mounted between them. A gear 66 is mounted on driven shaft 11 and arranged to mesh with gear 64 on counter-shaft 54. Gear 66 is formed with a clutch face 67, and a double-faced clutch part 68 is mounted on driven shaft 11 to slide between said clutch face 67 and clutch face 15 on the inner end of sleeve 13. Pivoted dogs 69 and 70 are mounted on the periphery of said clutch part 68 and are adapted to bear against the adjacent faces of rings 71 and 72 surrounding the clutch faces 15 and 67, respectively, for a purpose to be presently described. A rock-shaft 73 carries a shifting fork 74 which engages said clutch part 68. A double-faced cam 75 extends from said shifting fork and is adapted to engage with a spring mounted plunger 76 having a double-faced tapered upper end armed with an anti-friction roller at its apex by which said shifting fork is thrown from one position to the other, as will be presently described. A coiled spring 77, mounted in a socket 78 in which said plunger reciprocates, serves to normally hold said plunger upwardly against the tapered lower end of said cam 75.

The several parts of the mechanism, constructed and arranged as above described, are operated through the medium of the operating lever E by means which will be now described. Said operating lever E is rigidly secured on a rock-shaft 80, which is connected by a crank arm 81 to a reciprocating operating cam-bar 82. Said crank arm is connected to said cam-bar by means of a slotted or bifurcated end engaging with a block 83 mounted on a pivot pin 84 secured in said cam-bar (see Fig. 4). Said cam-bar is mounted to slide in suitable ways or supports in one side of the gear casing, preferably just below the line of division between the two parts A and $A^1$ of said casing, as best illustrated in Figs. 1, 4, 5 and 6. Near its front end it is formed with a series of notches 85, 86 and 87 in its vertical inner face, with which the cam-faced end 43 of the angle shifting-fork 41 is adapted to engage. Another notch or cam face 88 is formed in appropriate position to operate the clutch controlling devices, as will be presently described. A series of depressions, or cam faces, 89, 90, 91, 92 and 93 are formed in the upper edge of said operating cam-bar to operate and control different mechanisms, to be presently described. A plunger 94, mounted under tension of a spring 95 in a socket 96 and having a roller 97 on its lower end, is adapted to bear upon the upper edge of said operating cam-bar and engage with one or the other of the cam depressions 89, 90, 91, or 92. Said plunger 94 (see Fig. 7) is connected with one end 98 of a band-brake 99, the other end 100 of which is connected to a threaded stud 101 mounted in the casing $A^1$, said stud being also used for adjustment for the wear of said band-brake. Said band-brake 99 surrounds the cylindrical member 17 of the main driving clutch, and when said plunger is raised onto one of the high points adjacent to the depressions, said brake is caused to impinge said cylindrical part and retard its motion and, through it, the motion of the sleeve 13 and the clutch part 55 mounted on said sleeve.

Another plunger 102 is mounted in a socket 103 on the casing and adapted to reciprocate and engage in depression 92 in the upper end of said bar. Said plunger 102 has a notch in one side which engages a cylindrical-shaped end 104 of an arm 105 which is keyed to a rock-shaft 106, which rock-shaft extends transversely through the casing, being journaled in appropriate bearings on each side of the part $A^1$ thereof. Said rock-shaft 106 has a pin 110 projecting from one side thereof which engages a sleeve 170 mounted to slide on a longitudinal rod 127. Said sleeve carries a yoke 107 which is bifurcated and engages the rim 61 of the gear 50. Mounted on said shaft 106 is a sliding sleeve 108 having a downwardly extending arm 173, the lower end of which carries an anti-friction roller 109 adapted to bear on the inner edge of the operating cam-bar 82, which roller is adapted to engage the depression 88 when said cam-bar is brought to appropriate position. Said arm 173 is formed with a notch or perforation in one side which is engaged by a pin 175 mounted in casing $A^1$ and holds said arm and sleeve from rocking while permitting a transverse sliding movement thereof. Said sleeve 108 is slotted at 176 (Figs. 6 and 9), and the pin 110, connecting said shaft with the sleeve 170 on rod 127 extends through said slot, thus providing for the rocking of shaft 106 while sleeve 108 is held against any rocking movement. Another sleeve 111 is mounted on said rock-shaft 106 at the end of sleeve 108, and a coiled spring 112, interposed between said sleeve 111 and the adjacent side of the casing, serves to normally hold sleeve 111 against sleeve 108, and the roller 109 against the bar 82, with said roller bearing against the inner face of said bar and adapted to fall into said depression or notch 88 whenever the bar is moved to appropriate position. Sleeve 111 is held to rock with shaft 106 by a key 177 which passes through its side and engages a groove 178 in the shaft. A pin 113 is mounted in sleeve 111, extending upwardly therefrom. A lever 114 is mounted on a pivot 115, extending down from the top of casing $A^1$, being formed as best shown in Figs. 3 and 6, with one end having an angular offset point and the other end being adapted to engage in a notch 116 in the sliding rod 117. Said rod 117 is mounted to slide on suitable supports on the casing $A^1$. It will thus be seen that the rocking of sleeve 111 and arm 114 which results from the elevation of plunger 102 when bar 82 is slid forward, will vibrate lever 114 to allow spring 171 to slide rod 117 forward to engage latches 152 and 153. Then the sliding of sleeve 111 and pin 113 from the position shown in whole lines in Fig. 6, in which position the pin 113 stands in the angular recess in lever 114, to the position shown in dotted lines, will bring pin 113 to bear against the point of lever 114, throwing its other end in the opposite direction to engage the notch 116 in rod 117 and draw said rod backward, and release the clutch operating devices, as will be presently described.

Another rock-shaft 118 extends across the part A¹ of the casing, being journaled in appropriate bearings on each side thereof, and has an arm 119 keyed thereto, which engages with a notch in the side of a reciprocating plunger 120 mounted in a suitable socket 121. The lower end of said plunger 120 carries a roller 122 adapted to roll on the top edge of operating cam-bar 82 and engage with a depression 93 therein. Said rock-shaft 118 has an upwardly projecting arm 123 which engages with a notch 124 in rod 117. It also has a downwardly projecting arm 125 which engages a notch in a sleeve 126 mounted on rod 127. Said sleeve 126 is mounted on said rod by means of a key or spline and carries a yoke 128 engaging with the rim 62 of the gear 51.

Near the inner end of operating cam-bar 82, a pin 129 (Fig. 4) projects upwardly from its upper edge, adapted to contact with a pin 130 (Fig. 5) projecting horizontally from near the upper end of a crank arm 131 rigidly secured to the rock-shaft 73, which carries on its inner end the shifting-fork 74 for shifting the clutch part 68 on driven shaft 11.

Another rock-shaft 134, mounted in suitable bearings in each side of part A¹ of the casing, carries the reversing lever 135 rigidly secured thereto. A collar 136 is rigidly secured thereon, and has an upwardly projecting arm 137 adapted to engage a notch 139 in the rod 117, and a downwardly projecting arm 140 arranged in the path of the inner flange of the clutch part 68. Said rock-shaft 134 also has a collar 141 mounted thereon, carrying a shifting fork 142 which engages with the clutch part 65 on shaft 54. A double-faced cam is formed on the top end of a pin 143 which extends upwardly from the upper side of said sleeve 141, with which a roller 144 on the outer end of a spring 145, secured by a screw or rivet 146 to the casing part A¹, is adapted to engage, for a purpose to be presently described.

Rod 117 is mounted to reciprocate longitudinally in suitable bearings in the part A¹ of the casing and has a latch-part 147 hinged to its front end, a spring 148 being arranged to normally hold said latch to rest upon a stop pin 149. Another latch-part 150 is mounted in suitable bearings with its engaging point projecting through the socket in which the plunger 45 is mounted, and adapted to engage a notch in the side of said plunger to normally hold said plunger with the nut-part 44 on its lower end out of engagement with the screw-threaded part 33 of the sleeve 27. A spring 151 serves to normally hold said latch-part 150 to engage the notch in said plunger. The latch-part 147 has a hook 152 on its outer end adapted to engage notch 153 in the side of said latch-part 150 near the adjacent end thereof.

In order to guard against the operation of the reversing lever 135 except when the parts are properly set, that is, when at "no motion," I mount a reciprocating plunger 154 in a socket 155, a notch in the upper end of which is engaged by an angle-arm on the lower end of lever 135. The lower end of said plunger 154 is also formed with a notch through which the operating cam-bar 82 is adapted to slide. Said plunger 154 has a narrow flange, or lip, 157 at its lower end (Fig. 13), which is adapted to pass through a vertical notch 158 in the side of the operating cam-bar 82 and engage with a groove 159 in the edge of said cam-bar 82 which extends for a distance from said notch 158 to a point 160 (Figs. 4 and 13).

In operation, supposing the parts to be in the position shown in Figs. 1, 2, 3, and 4, in which position the gear is set to run at first or "slow" speed, and it being desired to change to the next or "second" speed, the change is effected as follows:

The operator, by means of lever E on rock-shaft 80 and the crank arm 81 connecting with the operating cam-bar 82, slides said cam-bar to bring the notch 91 to the position where the roller on the lower end of the plunger 94 will engage therewith. This motion changes the speed in the following manner: The band-brake 99 is set upon the rim of clutch part 17 by the raising of plunger 94 out of the notch 90 in the bar 82, which serves to raise the end 98 of said band-brake (see Fig. 7) and tighten it upon said rim. This serves to retard the motion of said clutch part 17 and the sleeve 13 carried therewith. Simultaneously therewith, the point 43 of the angle-shifting fork 41 is raised out of the notch 35 onto the high part of the edge of bar 82 between said notch 85 and notch 86, serving to slide collar 39 outward, engaging the angle or cam-shaped ends of the dogs 36, withdrawing the opposite ends of said dogs from the notches in the shaft 10, thus permitting collar 27, under the impulse of springs 48, to slide outward, releasing the frictional engagement between the disks carried by the respective clutch parts 17 and 20, thus releasing said clutch part 17 from positive connection with the driven shaft and enabling the band-brake 99 to perform its function of retarding the motion of said sleeve and the clutch part 55 carried thereby. At the same instant, plunger 102 is raised out of the depression 92 which, through the arm 105, rock-shaft 106, and arm 110, slides sleeve 170 and the yoke 107 thereon which engages with the rim 61 of the gear 50 to slide said gear 50 on sleeve 13 to release it from engagement with the clutch member 55. At the same time plunger 120 falls into depression 93 in the operating cam-bar and, through the connection with rock-shaft 118 by arm 119, rocks said shaft and, through the connection by means of arm 125, slides sleeve 126 and the yoke 128 carried thereby, said yoke engaging with rim 62 on gear wheel 51 and sliding said gear wheel to engage clutch part 55. Plungers 94 and 102 are mounted under pressure of springs 201 and 202, respectively, and thus act instantaneously. The teeth on the clutch face of gear 51 and on the clutch face of clutch part 55 will not fall into engagement, however, until the speed of clutch part 55 has fallen back or slowed down to that of gear 51, by reason of the dog 59 serving to hold said gears out of engagement. The first action in this operation resulting from applying the band-brake 99 is to retard the speed of the parts affected, including clutch part 55. While the application of the brake only continues for a very brief period of time, yet it is sufficient to retard the speed of part 55 to below that of gear 51 and may bring it to a full stop. The release of band-brake 99 permits a driving action between clutch parts 17 and 20 by reason of the oil friction between them, and the speed of the clutch part 55 is thereby again accelerated. As soon as its speed begins to exceed the speed of gear 51, dog 59 will immediately turn on its pivot and permit the gears or clutch faces between parts 50 and 51 to engage quietly and without clash or jar. This engagement is caused by plunger 120 dropping into recess 93 and the turning of shaft 118 under the expansion of spring 202, which causes sleeve 126 to slide and carry gear 51 toward part 55. At the same time, arm 123 contacts with notch 124, draws back rod 117, and engages the clutch parts 17 and 20 as below described.

When the mechanism is standing at no motion, roller 109 stands in depression 88, as shown in Figs. 6 and 10. When in this position, pin 113 on sleeve 111 stands back in the recess behind the point of lever 114, and rod 117 stands forward with its latch 147 engaged with latch 150. On starting from no motion to first speed, roller 109 passes out of depression 88 in the side of bar 82 to the position indicated by full lines in Fig. 1 and dotted lines in Fig. 6. This operation slides sleeve 111 from the position shown by whole lines to the position shown by dotted lines in Fig. 6, pin 113 passing from the recess in lever 114 to a position in contact with the point thereof, as shown in Fig. 3, which operates to turn lever 114 and, by reason of the engagement of its opposite end with notch 116 in rod 117, pulls said rod rearward, releases latch 150 from the plunger 45, and sets the clutch parts 17 and 20, which operate through the gears 50, 52, etc., to drive the driven shaft at first speed. In changing from first speed to second speed, plunger 102 passes from the depression in which it rests, as shown in Fig. 4, onto the top of bar 82, thus elevating said plunger and rocking shaft 106, which, through its connections, operates to throw pin 113 away from lever 114 so as not to interfere with the operation of rod 117 by the other mechanisms. It is held in this position until the bar 82 is returned to the position shown in Fig. 4. Whenever said rod 117 is free from either of the reversely operating devices, spring 171 will automatically operate to slide rod 117 forward so that the hook on latch part 147 will engage with the notch 153 in latch part 150. The rocking of rock-shaft 118, through the connection between its arm 123 and the notch 124 in said rod 117, draws said rod backward, releasing latch 150 from connection with plunger 45, permitting spring 46 to force said plunger downward and carry the nut-part 44 thereon into engagement with the threaded part 33 of the sleeve 27 which operates to force said sleeve inward, pressing the interengaging friction plates of the two clutch parts together, and permitting dogs 36 to be thrown into engagement with the notches in shaft 10, and locking said sleeve with the clutch in engaged position. At the same moment a cam 172 on the end of latch part 147 contacts with pin 149, lifting said latch part out of engagement with latch part 150 and permitting spring 151 to press part 150 forward. The cam 34 at this time turns to bring its high part to the upper side, lifting nut-part 44 out of engagement with threads 33 and into position where its notch will register with latch part 150 and be engaged thereby and held free from said threads until again released, as above described. By means of the threaded connections between the ring 23 and plate 22, and between the ring 29 and disk 28 on the sleeve 27, the length of the sliding movement of sleeve 27, necessary to operatively engage and disengage the interlocking plates of the respective clutch-parts, can be adjusted so as to take care of any wear between the parts. By means of the slight play, cushioned by the springs 26, allowed between the plate 22 and the ring 23, a slight excess movement is provided for without affecting the operation of the parts. Before movement of bar 82 it will be seen that the power is transmitted, when the parts are in the position shown in Fig. 1, from shaft 10 to shaft 11, through the gears 50, 52, shaft 54, gear 64, and gear 66. After the parts have been shifted as above described, the power will be transmitted from shaft 10, through gear 51, gear 53, shaft 54, gear 64 and gear 66, thus increasing the speed, inasmuch as the power is transmitted in the first instance from a gear of a smaller diameter to a gear of a larger diameter, and in the second instance from a gear of a larger diameter to a gear of a smaller diameter.

To change from the second speed to high speed, or direct drive, bar 82 is again shifted, as before, to bring depression 92 in position to engage with plunger 94 and to engage pin 129 with pin 130 on the crank arm 131 of the rock-shaft 73. This movement elevates plunger 120, sliding gear 51 out of engagement with clutch part 55 in the manner before described, gear 50 being already out, in which position it is maintained. In the meantime, plunger 94 has been operated as before to set the brake 99 and retard the movement of sleeve 13, which carries on its outer end the clutch face 15. The adjacent clutch face on clutch part 68 is held from falling into engagement with clutch face 15 by the dog 69 until the speed of said clutch part 15 is increased to slightly above that of said clutch part 68, in the same manner as before described for the dog 59. At the same time the sliding of clutch part 68 conacts with arm 140 and rocks collar 136 and arm 137 which engages rod 117, and in the same manner as before described, releases the plunger 45 carrying the nut-part 44 and sets the operating clutch. As soon as the speed of the two parts coincides, the clutch parts fall into engagement under the impulse of spring plunger 76, acting upon the tapered end of pin 75 projecting downwardly from the shifting fork 74.

A spring-mounted pin 161, adapted to slide in a vertical perforation in said bar 82, is arranged to operate rock-shaft 73 in the reverse direction. Said dog is held upwardly by means of a spring 162 and is formed with a tapered front corner at its upper end which is adapted to contact with pin 130 when bar 82 is slid forward, which operates to slide said pin downwardly, permitting it to pass under said pin 130. On the return movement, however, the rear face of said dog 161 contacts with the opposite side of pin 130 and, through the crank arm 131, swings said rock-shaft and the shifting-fork carried thereby, together with the clutch part 68, in the reverse direction. On the reverse movement of bar 82 after rock-shaft 73 has been operated the rear top corner of pin 161 contacts with a cam 180 on casing A¹ which depresses to pass under pin 130.

For reversing the motion of the driven shaft, I provide a counter-shaft 185 having a long sleeve 186 with gears 187 and 188 thereon which meshes with gear 66 and also with gear 63 on shaft 54. Said gear 63 has a clutch face adapted to mesh with one face of clutch part 65 in the same manner that clutch part 68 engages with clutch face 15. The shifting fork 142 mounted on the sleeve 141 carried on the shaft 134 and operated by the reversing lever 135, operates to shift said clutch part 65 from in position to engage clutch face of gear 64, to engage with clutch face of gear 63 when desired to reverse. The shifting of the parts by the lever carries the clutch faces into contact as described in reference to the other parts, the engagement being effected when the speed of the respective parts substantially coincides.

Before the reverse operation of the mechanism, the notch 158 must stand to register with the plunger 154 and the roller on the lower end of plunger 94 rests in notch 89 in the top of bar 82. This is in the position of "no motion." It being desired to reverse the car, lever 35 is operated to raise plunger 154 to bring the projecting lip 157 to register with groove 159, which, at the same time, shifts clutch part 65 to engage the gear 63 and establish a reverse driving connection with the driven shaft, as will be readily understood. The bar 82 is then slid outward to bring the gear into first speed or second speed position, as may be desired, but by reason of the engagement between lip 157 of the plunger 154 and the groove 159 of the bar 82, it is impossible to change the direction of motion until said bar 82 is again slid to "no motion" position, or when the roller on the end of plunger 94 rests in notch 89, when plunger 154 registers with notch 158 and may fall to bring lip 157 below said bar 82. The length of groove 159 limits the number of speeds at which the mechanism can be driven in reverse position, it being unnecessary to provide for high speed on reverse motion; and I have, therefore, by limiting the length of said groove at point 160, limited the reverse speed to first and second speeds, respectively.

Plunger 94 serves not only to operate the band-brake, but also to indicate to the operator as it drops into the respective notches when the bar 82 has been slid to reach the respective positions to secure the several selective operations. The friction clutch cannot be automatically set and locked except by moving lever E and bar 82 to first position. The limit of movement of bar 82 in reverse action of the gear is made for the purpose of preventing the direct clutch 15 on sleeve 13 from engaging, because these clutch parts are running in opposite directions. In changing from direct, or high speed, to second speed, the clutch 68 is also prevented by dogs 70 from engaging until the speed of the two elements coincide. By reason of forming the gears with spiral teeth, full and positive clutch engagement is insured.

While this gear, as illustrated, is designed for three speeds, it will be understood, of course, that this number of speeds may be increased by the mere duplication of mechanism. It will also be understood that many modifications in details of construction and arrangements of parts may be made without departing from the spirit or scope of my invention.

Having thus fully described my said invention, what I claim as new and desire to secure by Letters Patent is:

1. A speed change gearing comprising a driving shaft, a driven shaft, clutch mechanism between said shafts, means operated by the driving shaft to set said clutch mechanism embodying a sliding screw-threaded connection, means for disengaging said screw-threaded connection after the clutch has been set, and means for locking said clutch in set position, substantially as set forth.

2. A speed change gearing comprising a driving shaft, a driven shaft, a clutch interposed between said shafts and adapted to couple one to the other when said clutch is set, a sliding part mounted on said driving shaft and adapted to operate said clutch part into set position and provided with an exteriorly screw-threaded portion, a nut-part mounted to move into and out of engagement with said screw-threaded portion, means for disengaging said nut-part from said screw-threaded portion, means for locking it in disengaged position, means for releasing it when it is desired for the clutch part to be set, means for locking said clutch part in set position, and means for unlocking said clutch part, substantially as set forth.

3. A speed change gearing comprising a driving shaft, a driven shaft, a clutch interposed between said shafts and adapted to couple them together, a sleeve mounted on said driving shaft adapted to slide longitudinally thereof and operate to set the clutch, said sleeve being formed with a screw-threaded portion, a nut-part adapted to move into and out of engagement with said screw-threaded portion whereby it may be operated to set said clutch, means for moving said nut-part out of engagement with said screw-threaded portion after the clutch is set, means for locking said sleeve with the clutch part in set position, means for holding said nut-part out of engagement with said screw-threaded portion of the sleeve, means for returning said nut-part into engagement with said screw-threaded portion when it is desired to set the clutch, means for disengaging the clutch locking means, and means for expanding or releasing said clutch, substantially as set forth.

4. A change speed gearing comprising a driving shaft, a driven shaft, a driven element mounted on said driving shaft, a clutch between said driving shaft and said driven element, gears loosely mounted on said driven element, a clutch collar secured to said driven element adapted to be engaged by either one or the other of said gears, a counter-shaft carrying gears engaging with the gears on said driven element, a gear on the driven shaft, and another gear on said counter-shaft engaging said gear on the driven shaft, substantially as set forth.

5. A change speed gearing comprising a driving shaft, a driven shaft, a counter-shaft, a driven element mounted on said driving shaft, a driving clutch part secured to said driving shaft, a driven clutch part secured to said driven element, gears loosely mounted on said driven element, a clutch collar on said driven element, means for selectively engaging either of said gears with said clutch collar, gears secured on said counter-shaft engaging the said loosely mounted gears, a gear secured to the driven shaft, and another gear on the counter-shaft engaging with the gear on the driven shaft, substantially as set forth.

6. A change speed gearing comprising a driving shaft, a driven shaft, a counter shaft, a sleeve mounted on said driving shaft, a driven clutch part connected with said sleeve, a driving clutch part on said driving shaft, means for setting and releasing said clutch parts, gears loosely mounted on said sleeve, a clutch collar interposed between said gears and secured to said sleeve, means for selectively engaging said gears with said clutch collar, gears secured to said counter-shaft and engaging with said gears loosely mounted on said sleeve, another gear on said counter-shaft, and a gear on the driven shaft engaging said last mentioned gear, substantially as set forth.

7. A change speed gearing comprising a driving shaft, a driven shaft, a counter-shaft, a sleeve loosely mounted on said driving shaft, a driven clutch part connected with said sleeve, a driving clutch part connected with said driving shaft, means for setting and releasing said clutch parts, gears of varying diameters loosely mounted on said sleeve, a clutch collar fixed on said sleeve between said gears, means for selectively engaging said gears with said clutch collar, complementary gears secured on said counter-shaft and engaging with said gears on said sleeve, another gear mounted on said counter-shaft, a gear mounted on the driven shaft engaging with said last mentioned gear on the counter-shaft, means for clutching the driven shaft to the driving sleeve direct, and means for securing the other driving elements out of driving engagement during said direct engagement, substantially as set forth.

8. A change speed gearing comprising a driving shaft, a driven shaft, a counter-shaft, a sleeve mounted on said driving shaft, a driven clutch element connected with said sleeve, a driving clutch element connected with the driving shaft, gears loosely mounted on said sleeve formed with clutch faces, a clutch collar secured on said sleeve between said gears and having clutch faces on each end, means for selectively engaging said gears with said clutch collar, complementary gears secured on said counter-shaft and engaging with the gears on said sleeve, another gear on said counter-shaft, a clutch for engaging and disengaging said gear with said counter-shaft, a gear on the driven shaft engaging the said last mentioned gear of the counter shaft, and means for throwing all of said gears out of driving relation and coupling the driving sleeve directly to the driven shaft, substantially as set forth.

9. A change speed gearing comprising a driving shaft, a driven shaft, a counter-shaft, a sleeve mounted on the driving shaft and extending beyond the inner end thereof and formed with a clutch face on its inner end, a clutch part on said sleeve, another clutch part on said driving shaft, means for setting and releasing the clutch composed of said clutch parts, gears loosely mounted on said sleeve formed with clutch faces, a clutch collar secured on said sleeve between said gears, means for selectively engaging said gears with said clutch collar, gears secured on the counter-shaft engaging said gears on the sleeve, other gears on said counter-shaft, a clutch collar interposed between said other gears, means for engaging said clutch collar with either one of said gears, another gear mounted on the driven shaft and engaging with one of said gears on the counter-shaft, a second counter-shaft, a train of gears carried by said second counter-shaft engaging the other of said gears on said first counter-shaft with the gear on said driven shaft, whereby said driven shaft may be driven in either direction, and means for coupling said driven shaft direct to the driving sleeve on the driving shaft, substantially as set forth.

10. A change speed gearing comprising a driving shaft, a driven shaft, a counter-shaft, a sleeve on said driving shaft, a driven clutch part connected with said sleeve, a driving clutch part connected with said shaft, means for setting and releasing the clutch composed of said two clutch parts, gears loosely mounted on said sleeve, a clutch collar secured on said sleeve between said gears, means for selectively engaging said gears with said clutch collar, gears secured to said counter-shaft engaging said gears on said sleeve, a clutch part on the inner end of said sleeve, a clutch part on the driven shaft in line with said sleeve, other gears on the counter-shaft, a gear on the driven shaft meshing with one of said gears on the counter-shaft, a second counter-shaft carrying gears meshing with the other gear on said counter-shaft and to the gear on the driven shaft, and a clutch for locking one or the other of said gears to the counter-shaft whereby said driven shaft may be driven in either direction and at varying speeds, substantially as set forth.

11. A change speed gearing comprising a driving shaft, a driven shaft, driven elements connected with said driven shaft, clutch mechanism for coupling the driving shaft to the driven elements, said driven elements embodying a series of loosely mounted gears of varying diameters, a counter-shaft having a series of complementary gears fixed thereto engaging said loosely mounted gears, means for automatically clutching and unclutching said loosely mounted gears selectively and progressively at the release and before engagement of the main clutch, and means for automatically checking the motion of the driving element at each point of release whereby said loosely mounted gears are engaged without clash or shock, substantially as set forth.

12. A change speed gearing comprising a driving shaft, a driven shaft, driven elements connected with said driven shaft, a frictional clutch for coupling the driving shaft to the driven elements, means for engaging said frictional clutch operated by the rotary motion of said driving shaft, operating means for locking said clutch, and means for disengaging said clutch from the operating means after said clutch is locked, substantially as set forth.

13. A change speed gearing comprising a driving shaft, a driven shaft, driven elements connected with said driven shaft, driving elements connected with said driving shaft, a frictional clutch arranged to couple the driving shaft to the driving elements, means for setting said clutch by the rotary motion of said driving shaft, means for automatically releasing said setting means when the clutch is locked, means for selectively engaging one set of driving elements with another set of driven elements, said several sets of driving and driven elements being arranged for different speeds and comprising loosely mounted gears on one shaft and fixed gears on a counter-shaft, and a chain of gearing connecting said counter-shaft with the driven shaft, substantially as set forth.

14. A change speed gearing comprising a driving shaft, a driven shaft, driven elements connected with said driven shaft, a frictional clutch for coupling said driving shaft to the driven elements, a countershaft, gears mounted on the driven shaft, means for automatically, selectively and progressively coupling said gears to said driven shaft while the frictional clutch is disengaged, complementary gears fixed on a counter-shaft, gearing connecting said counter-shaft with the driven shaft, and means for automatically checking the speed of the driven shaft while the frictional clutch is disengaged whereby said loosely mounted gears will be engaged without clash or shock, substantially as set forth.

15. A change speed gearing comprising a driving shaft, a driven shaft, driven elements connected to said driven shaft, a frictional clutch for coupling said driving shaft to the driven elements, said driven elements comprising a sleeve mounted on the driving shaft, loosely mounted gears on said sleeve adapted to be selectively and progressively secured thereto, a counter-shaft, complementary gears on said counter-shaft meshing with said loosely mounted gears, means for engaging said frictional clutch operated by the rotary motion of the driving shaft, means for automatically controlling the engagement of the frictional clutch, and means for automatically checking the motion of the driven elements by the release of said frictional clutch whereby the clutching of said gears is effected without clash or shock, substantially as set forth.

16. A change speed gearing comprising a driving shaft, a sleeve mounted on said driving shaft to rotate independently thereof, a driving clutch part on said driving shaft, a driven clutch part attached to said sleeve, means for setting and releasing the clutch composed of two clutch parts, a driven shaft in line with said driving shaft, a countershaft parallel with said driving and driven shafts, a series of gears for connecting the sleeve on said driving shaft through said counter-shaft with said driven shaft, means for coupling one or the other of said gears to secure a selective speed, and means for operating said several parts comprising a reciprocating bar having operative cam faces connected by operative connections with the means for operating said several parts and arranged in relation to each other to release the clutch between the driving shaft and the sleeve thereon, to retard the motion of said sleeve, shift the gears from the position for one speed to the position for another speed, re-set the clutch between the driving shaft and the sleeve and lock said parts in the new position, substantially as set forth.

17. A change speed gearing comprising a driving shaft, a driven shaft, driven elements, several sets of operating devices, means for transmitting motion from the driving shaft to the driven shaft at varying speeds including clutch mechanisms for coupling the driving shaft to the driven elements and the several gears for the selective speeds in operative connection, and means for operating said several sets of mechanism by a single lever embodying a sliding bar having a series of cam faces engaging with the several sets of operating devices, said cam faces and operating devices being arranged in relation to each other so that the movement of the operating lever to change from one speed to another releases the main driving clutch and retards the movement of the main driving element, shifts the connection between the gears from one speed to another, re-sets the main driving clutch and locks the other driving elements out of driving relation, substantially as set forth.

18. A change speed gearing comprising a driving shaft, a driven shaft, a driving clutch between said two shafts, a chain of gearing connecting said two shafts and controlled by said driving clutch, said gearing comprising several separate driving connections arranged to drive at varying speeds, and means for throwing either of said gearings into operative connection embodying a sliding bar having a series of cam faces arranged for engaging and operating the several sets of mechanism, substantially as set forth.

19. A change speed gearing comprising a driving shaft, a driven shaft, a driving clutch between said shafts, several sets of gears for connecting the driving to the driven shaft at different speeds, means for setting the driving clutch by the motion of the driving shaft, means for controlling said setting means, and an operating cam-bar connected to each set of mechanism to effect the several operations in orderly succession, substantially as set forth.

20. A change speed gearing comprising a driving shaft, a driven shaft, a driving clutch between them, means for setting and releasing said clutch, several sets of gears in the connection between the driving and the driven shafts, means for coupling said sets of gears in driving connection one at a time, for varying speeds, means arranged exterior of said gears for effecting said several connections, and an operating cam-bar with a series of cam-faces connected to operate said several sets of mechanisms successively and selectively, substantially as set forth.

21. A change speed gearing comprising a driving element, a driven element, a frictional clutch coupling said elements, a counter-shaft having change speed gears secured thereto, change speed gears loosely mounted on said driven element, means for automatically progressively or selectively coupling said gears to said driven element only while said frictional clutch is disengaged, and means for automatically checking the motion of said driven element at the same time, whereby said loosely mounted gears will engage without clash or shock, substantially as set forth.

22. A change speed gearing comprising a driving element, a driven element, a frictional clutch coupling said elements, a counter-shaft having a series of change speed gears secured thereon, similar gears loosely mounted on a driven element and engaging those on the counter-shaft, means for engaging said frictional clutch, means for releasing said clutch, means for automatically controlling the engagement of said frictional clutch by the change of engagement of the gears with the driven element, and means for automatically checking the motion of said driven element upon the release of said frictional clutch, whereby the engagement of said clutch gears on the driven element is made without shock or clash, substantially as set forth.

23. A change speed gearing comprising a driving element, a driven element, a frictional clutch coupling said elements, a counter-shaft, a series of change speed gears on said counter-shaft, a series of complementary gears loosely mounted on a driven element, means for automatically making one change of speed gears active and another set inactive after the frictional clutch is released, and means for automatically checking or stopping the motion of the driven element at the same time, whereby any change speed gear set may be made active without clash or shock, substantially as set forth.

24. A change speed gearing comprising a driving element, a driven element, a frictional clutch coupling said elements, change speed gears on the driven element arranged to be alternately and automatically coupled for driving either progressively or selectively, means for releasing the clutch, means for checking the motion of the driven element, means for unclutching one set of gears and clutching another, means for setting the frictional clutch, and a single moving element connected to operate said several means for effecting said several results, all in orderly succession, substantially as set forth.

25. A change speed gearing comprising a driving element, a driven element, a frictional clutch coupling said elements, means to release said frictional clutch, means to check or stop the motion of the driven element, a series of change speed gears connecting said driving and driven elements, means to unclutch the driving connection of one of said series of gears, means to clutch another of said series of gears, means to set the frictional clutch by the rotary motion thereof, and a single element connected by appropriate means to operate said several means, all in orderly and automatic succession, substantially as set forth.

26. A change speed gearing comprising a driving element, a driven element, a frictional clutch coupling said elements, means for releasing said frictional clutch, means for retarding the motion of the driven element, a series of change speed gears connecting said driving and driven elements, means for unclutching one set of said gears and clutching another set, and a single moving element connected to operate said several means, all in orderly and automatic succession, substantially as set forth.

27. A change speed gearing comprising a driving element, a driven element, a frictional clutch coupling said elements, change speed gears connecting said elements, and a single moving element connected to operate said several means and reset the clutch, all in successive and automatic order, substantially as set forth.

28. A change speed gearing comprising a driving element, a driven element, a frictional clutch coupling said elements, change speed gearing connecting said elements, means for progressively or selectively uncoupling one set of gears and coupling another, and a single moving element connected to operate said several means, substantially as set forth.

29. A change speed gearing comprising driving and driven elements, a frictional clutch coupling said elements, change speed gears connecting said driving and driven elements, a single element uncoupling said clutch and changing from one speed gear to another, means for resetting said clutch automatically, and means for preventing said resetting before said change from one speed to another has been effected, substantially as set forth.

30. A change speed gearing comprising a driving element, a driven element, gears arranged to transmit motion from said driving element to said driven element at a plurality of speeds, and means by which change from one to any other speed both progressive and selective can be made by the movement of a single element, substantially as set forth.

31. In a change speed gearing, driving and driven elements, a frictional clutch coupling said elements, a series of change speed gears, means by which by the movement of a single element said clutch is disengaged, the motion of the driven element checked or stopped, one set of change speed gears on the driven element uncoupled and another engaged, means for preventing said engagement from occurring until the driving connection to said gears on the driven element has been checked or reaches the speed of the gear, means for then automatically effecting the connection, and a connection with the actuating means which automatically sets the frictional clutch, substantially as set forth.

32. In a speed change gearing, driving and driven elements, a frictional clutch coupling said elements, a series of change speed gears on said driven element, means by which by the movement of a single element by hand said clutch is disengaged, the motion of the driven element is checked or stopped, one set of change speed gears on the driven element is disengaged and another engaged, means for preventing said engagement until the driving connection to said gears on the driven element reaches the speed of said gear, and means for then automatically engaging said connection, substantially as set forth.

33. In a change speed gearing, driving and driven elements, a frictional clutch coupling said elements, a series of gears loosely mounted on said driven element, clutches on said gears by which they are coupled to said driven elements, and means for preventing the engagement of said gears with said driven element until said element has reached the speed of said gears, whereby clash in their engagement is avoided, substantially as set forth.

34. A change speed gearing comprising a driving element, a driven element, a series of connecting change speed gears, and a single moving element by which change of speed is effected through said series of change speed gears by automatically releasing a clutch, checking the speed of the driven element, engaging and disengaging the change speed gears from the driver, and resetting the clutch by the action of engagement of said gears, all in successive order, substantially as set forth.

35. A change speed gearing comprising driving and driven elements, a series of change speed gearing, means by which by the movement of a single element said elements are disengaged, the motion of the driven element is checked or stopped, one of the series of change gears disengaged, and another engaged while said driven element is checked or stopped and the elements reengaged all in automatic and consecutive order, whereby the change of speed is effected without clash or shock, substantially as set forth.

36. A change speed gearing comprising driving and driven elements, a frictional clutch coupling said elements, a series of change speed gears, means by which by the movement of a single element by the operator said frictional clutch is disengaged, the motion of the driven element is checked or stopped, one of the series of change speed gears is disengaged, another series of gears engaged with said driven element, the speed of said checked element increased to the speed of the gear to be engaged, means for preventing earlier engagement, and means for reëngaging said frictional clutch, all automatically and in consecutive order, substantially as set forth.

In witness whereof I have hereunto set my hand and seal at Washington, District of Columbia, this twenty-second day of July, A. D. nineteen hundred and fifteen.

ABRAHAM B. LANDIS. [L. S.]

Witness:
   E. S. CLEMENTS.